United States Patent [19]
Bender

[11] 3,835,499
[45] Sept. 17, 1974

[54] WINDSHIELD WIPER

[75] Inventor: Klaus Bender, Esslingen (Neckar), Germany

[73] Assignee: Daimler-Benz A.G., Unterturkheim, Germany

[22] Filed: Feb. 26, 1971

[21] Appl. No.: 119,257

[30] Foreign Application Priority Data
Feb. 28, 1970  Germany.............................. 2009488

[52] U.S. Cl. ........................... 15/250.04, 15/250.36
[51] Int. Cl. ............................. B60s 1/52, B60s 1/38
[58] Field of Search....... 15/250.01, 250.03, 250.04, 15/250.36, 250.22, 250.24, 250.32, 250.16

[56] References Cited
UNITED STATES PATENTS

| | | | |
|---|---|---|---|
| 1,301,609 | 4/1919 | Scott................................... | 15/250.3 |
| 3,008,170 | 11/1961 | Marks................................ | 15/250.3 |
| 3,289,237 | 12/1966 | Lindsey............................. | 15/250.24 |
| 3,447,187 | 6/1969 | Barrett............................... | 15/250.16 |
| 3,456,278 | 7/1969 | Mandy et al...................... | 15/250.02 |
| 3,493,804 | 2/1970 | Fennell............................. | 15/250.01 |

*Primary Examiner*—Peter Feldman
*Attorney, Agent, or Firm*—Craig & Antonelli

[57] ABSTRACT

A windshield wiper, particularly for the headlight glass panes of motor vehicles in which a wiper lamella consisting of a support part and of an elastic wiper blade arranged on the latter is constructed in such a manner as to be elastically bendable, preferably in a plane parallel to the surface to be cleaned; the lamella assumes its normal rest position approximately within the area of the outer boundary of the surface to be cleaned at a projecting edge.

19 Claims, 8 Drawing Figures

PATENTED SEP 17 1974

INVENTOR
KLAUS BENDER

BY Craig, Antonelli, Stewart & Hill
ATTORNEYS

WINDSHIELD WIPER

The present invention relates to a windshield wiper, especially for headlight glass panes of motor vehicles.

The present invention is concerned with the task to provide a windshield wiper which, in contrast to the hitherto customary windshield wipers, offers considerable advantages by a structurally favorable realization and a large wiper field. The underlying problems are solved according to the present invention in that a wiper lamella consisting of a support part and of a wiper rubber element arranged thereat, is constructed elastic in bending preferably in a plane parallel to the surface to be cleaned and assumes its rest position approximately within the area of the outer boundary of the surface to be cleaned at a projecting edge.

According to a further embodiment of the present invention, the windshield wiper lamella may be secured at its two ends directly at shafts which are arranged as far as possible from one another within the edge and perpendicularly to the surface to be cleaned. One of the shafts can be constructed as drive shaft with rotary movements periodically changing the direction. It is achieved in this manner that the windshield wiper lamella slides over the headlight glass pane in a twisting or wriggling motion as soon as the drive shaft begins to rotate. It is considered as particular advantage that nearly the entire surface of the headlight glass pane is passed over in this manner by the windshield wiper lamella and the light yield is thereby optimum at all times. The elasticity of the wiper element of rubber or similar material permits the application of the windshield wiper of the present invention also to slightly curved headlight glass panes.

For purposes of braking the drive of the windshield wiper lamella, especially shortly prior to attaining each turning point, the present invention proposes to equip the non-driven shaft with a brake mechanism of any conventional construction, for example, with a viscosity or friction brake of known construction.

In order that the windshield wiper lamella abuts at the headlight glass with the necessary pressure, compression springs may be arranged at the shafts.

Another purpose underlying the present invention, namely, to combine the wiper installation with a windshield washer installation, is solved according to the present invention in that the non-driven shaft is bored through for the supply of washing liquid and is provided within the area of its outer end with a preferably double spray nozzle. Additionally, the mounting part and/or the wiper rubber element of the wiper lamella may be equipped in a conventional manner with channels for the supply of washing liquid directly to the surface to be cleaned.

For the application of the windshield wiper according to the present invention to a double headlight consisting preferably of circular headlights, it is proposed according to the present invention that the drive shaft is arranged between the two circular headlights and drives a double wiper lamella extending over both circular headlights.

However, the wiper arrangement of the present invention may also be used with a windshield. In that connection, preferably two windshield wiper lammellae may be arranged according to the present invention at the windshield, whereby the drive shafts can be arranged in the outer lower corners of the windshield and the non-driven shafts in the center of its upper edge or, in the alternative, the drive shafts may be arranged in the center of the lower edge and the non-driven shafts in the outer upper corners of the windshield.

Accordingly, it is an object of the present invention to provide a wiper installation for wiping glass surfaces which avoids by simple means the aforementioned shortcomings and drawbacks encountered in the prior art.

Another object of the present invention resides in a wiper installation for the headlights and/or windshields of motor vehicles which assures a favorable structural realization coupled with a large wiped field.

A further object of the present invention resides in a wiper installation which can be readily adapted to wipe glass surfaces of any desired configuration to assure optimum light yield at all times.

Still another object of the present invention resides in a wiper installation of the type described above which can also be readily combined with a washing installation to wash the surface of the glass to be wiped.

These and other objects, features, and advantages of the present invention will become more obvious from the following description when taken in connection with the accompanying drawing which shows, for purposes of illustration only, several embodiments in accordance with the present invention, and wherein.

Figure 1:
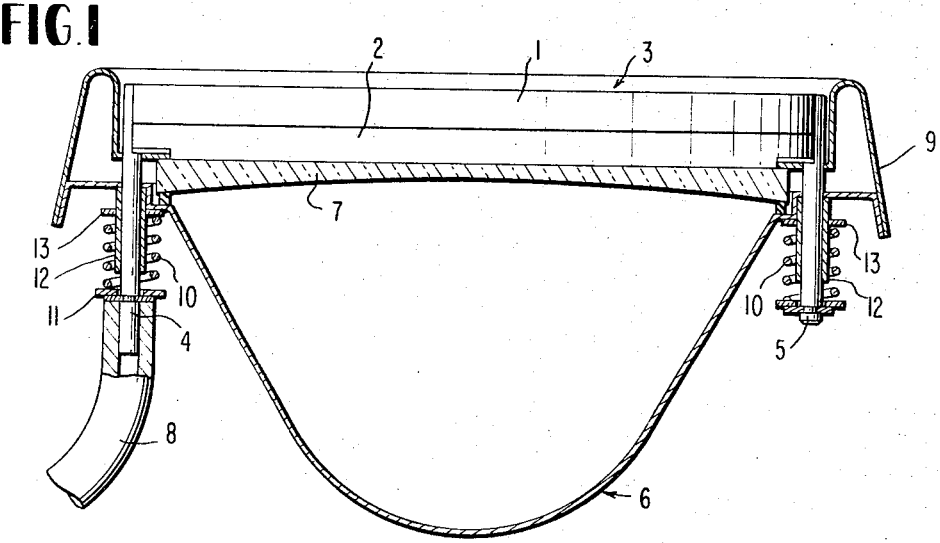
FIG. 1 is a partial cross-sectional view through a headlight with a wiper installation in accordance with the present invention.
Figure 2:
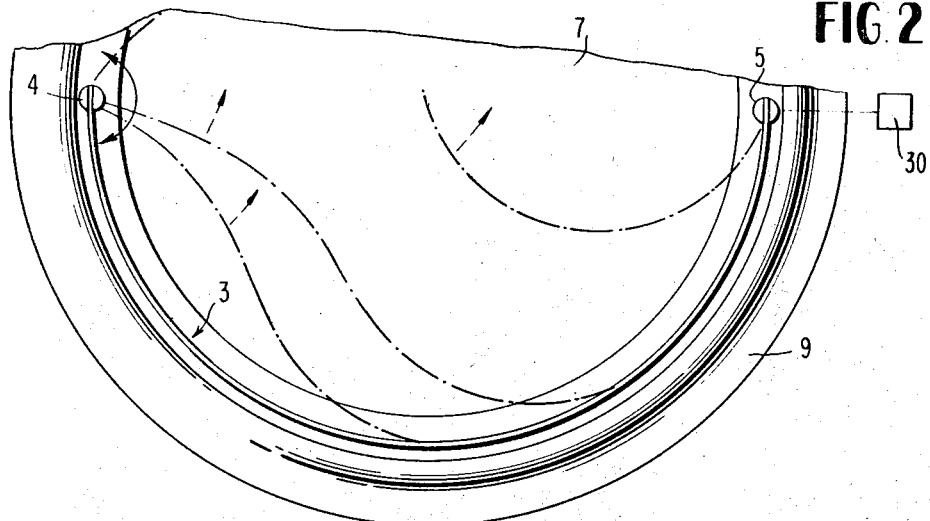
FIG. 2 is a partial plan view of the headlight according to to FIG. 1.
Figure 5:
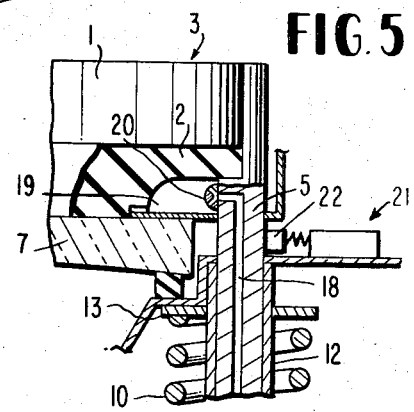
FIG. 5 is a partial cross-sectional view through a non-driven shaft of a wiper installation in accordance with the present invention.

Referring now to the drawing wherein like reference numerals are used throughout the various views to designate like parts, and more particularly to FIGS. 1 and 2, a wiper lamella generally designated by reference numeral 3 which consists of a support part 1 made from flexible, for example, rust-free spring-hardened steel and of a rubber wiper element arranged thereon, is so secured between two shafts 4 and 5 that it slides in twisting or wiggling movements (FIG. 2) over a headlight glass 7 belonging to a circular headlight 6 as soon as the shaft 4 is set into rotation which is constructed as drive shaft with rotary movements periodically changing the direction. A flexible drive shaft 8 is mounted over the driven end of the drive shaft 4. A conventional windshield wiper motor of any known construction (not shown) serves as driving motor. In its normal rest position, the windshield wiper lamella 3 rests within the area of the outer boundary of the headlight glass pane 7 at a projecting edge 9 constructed as decorative ring. The wiper lamella 3 is pressed against the headlight glass 7 by compression springs 10 which are arranged at the shafts 4 and 5 between a ring 11 secured at the ends of the shafts 4 and 5 and a ring 13 belonging to the bearing supports 12 of the shafts 4 and 5. Fig. 5 schematically illustrates a braking device 21, including friction means 22 for applying braking action to the shaft 5. In FIG. 2, reference numeral 30 schematically depicts a vicosity brake for applying braking action to the shaft 5. The elasticity of the wiper rubber 2 permits the application of this type of wiper also to slightly curved headlight glasses.

Figures 3, 4:
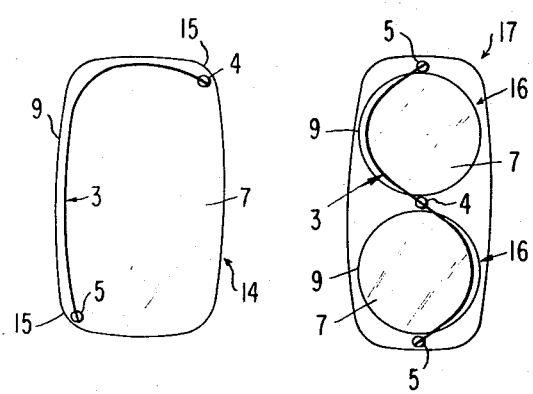
FIG. 3 is a schematic plan view on an essentially rectangular headlight with a wiper installation in accordance with the present invention.
FIG. 4 is a schematic plan view on a double headlight consisting of two circular headlights with a wiper installation in accordance with the present invention.

With an essentially rectangular headlight generally designated by reference numeral 14 and illustrated in FIG. 3, the shafts 4 and 5 are arranged in two diagonally opposite corners 15 of the headlight 14.

In FIG. 4 is illustrated the arrangement of a windshield wiper according to the present invention for a double headlight generally designated by reference numeral 17 consisting of two round headlights 16 whereby the drive shaft 4 is arranged between the two circular headlights 16 and drives a double wiper lamella 3 extending over both round headlights 16. The ends of the wiper lamella 3 are each secured in non-driven shafts 5.

Figure 6:
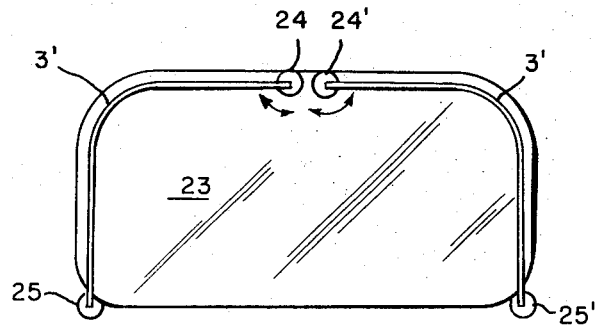
FIG. 6 is a schematic plan view of a wiper installation for a windshield in accordance with the present invention.
Figure 7:
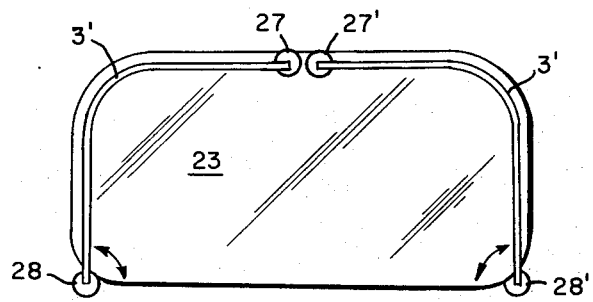
FIG. 7 is a schematic plan view of a second embodiment of a wiper installation for a windshield in accordance with the present invention.
Figure 8:
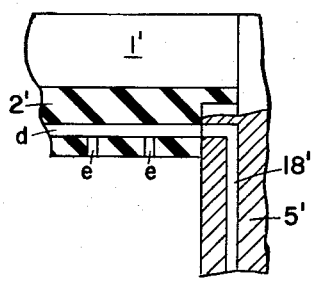
FIG. 8 is a partial cross-sectional view taken in the same direction as FIG. 5 and showing a modified washing fluid conducting arrangement according to the invention.

It can be seen from FIG. 5 how the non-driven shaft 5 for a windshield wiper which is combined with a windshield washing installation is provided with a longitudinal bore 18 for the feed of washing liquid; the bore terminates at the height of the wiper element 2 which is provided at this location with a recess 19, in a double spray nozzle 20 which, for the sake of simplicity, is illustrated in the drawing rotated through 90°. The washing liquid is sprayed in this manner onto the headlight glass 7 on both sides of the wiper element 2. FIGS. 6 and 7 schematically illustrate wiper arrangements for a windshield. In FIG. 6, windshield glass 23 is wiped by lamella 3'. The upper ends of lamella 3' are driven by driving shafts 24, 24' arranged at an upper central position on the windshield and the lower ends are supported by non-driven shafts 25, 25' positioned at the outer bottom corners of the windshield. The FIG. 7 arrangement is similar to the FIG. 6 arrangement, except the lower shafts 28, 28' are driven and the upper shafts 27, 27' are non-driven. FIG. 8 schematically depicts a modified arrangement for supplying washing fluid, with longitudinal bore 18' through non-driven shaft 5' opening into a duct d arranged in the wiper element 2'. Smaller ducts e branch off from the duct d for supplying the fluid at the respective edges of the wiper blade.

While I have shown and described several embodiments in accordance with the present invention, it is understood that the same is not limited thereto but is susceptible of numerous changes and modifications as known to those skilled in the art. For example, the blade 2 mounted on the support 1 may also consist of any suitable synthetic resinous material as known at present for such purpose. Additionally, the present invention can also be used not only with headlights, but also with windshields for motor vehicles. Thus, it is obvious that the present invention is susceptible of numerous changes and modifications, and I therefore do not wish to be limited to the details shown and described herein but intend to cover all such changes and modifications as are encompassed by the scope of the appended claims.

I claim:

1. A wiper installation comprising:
    wiper lamella means including mounting means and elastic wiper means arranged on said mounting means, said mounting means and wiper means being elastically bendable in a plane,
    first and second shaft means spaced from one another adjacent edge portions of a surface to be cleaned, said lamella means being secured directly to both of said first and second shaft means,
    driving means for rotatably driving said first shaft means with periodic changes in rotational direction such that said lamella means is moved periodically across the surface to be cleaned with the other end thereof rotatably supported at said second non-driven shaft means,
    compression spring means arranged at said second shaft means for pressing the lamella means against the surface to be cleaned,
    and brake means for applying braking forces to the rotational motion of said second non-driven shaft means.

2. A wiper installation according to claim 1, characterized in that said plane is substantially parallel to the surface to be cleaned.

3. A wiper installation according to claim 2, characterized in that said lamella means is operable to clean the surface of a headlight of a motor vehicle.

4. A wiper installation according to claim 1, characterized in that said brake means is a viscosity brake.

5. A wiper installation according to claim 1, characterized in that said brake means is a friction brake.

6. A wiper installation combined with a washing installation according to claim 1, characterized in that the non-driven shaft means is provided with a longitudinal bore for the feed of washing liquid and is provided at its outer end with a spray nozzle means.

7. A wiper installation according to claim 6, characterized in that said spray nozzle means is a double spray nozzle.

8. A wiper installation according to claim 6, characterized in that at least one of the two parts consisting of said mounting means and said elastic wiper means is provided with channel means for the supply of washing liquid directly to the surface to be cleaned.

9. A wiper installation according to claim 8, characterized in that both said support means and said elastic wiper means are provided with said channel means.

10. A wiper installation according to claim 8, characterized in that the first shaft means is arranged between two headlights and drives a double lamella means extending over both headlights, said second shaft means being at the edge of one of said headlights and a third shaft means being secured to said double lamella means at the edge of the other of said headlights.

11. A wiper installation according to claim 10, characterized in that the headlights form a double headlight consisting of circular headlights.

12. A wiper installation according to claim 8, characterized in that the surface to be cleaned is a windshield and in that two of said lamellae means are arranged at said windshield, the first drive shaft means of the respective lamellae means being arranged in the outer lower corners of the windshield and the non-driven shafts of the respective lamellae means being arranged within the central area of the upper edge of the windshield.

13. A wiper installation according to claim 8, characterized in that the surface to be cleaned is a windshield and in that two of said lamellae means are arranged at said windshield, the first shaft means of the respective lamallae means being arranged within the central area at the upper edge of the windshield and the second non-driven shaft means of the respective lamellae means being arranged in the outer lower corners of the windshield.

14. A wiper installation according to claim 1; charactertized by compression spring means arranged at the first shaft means which press the lamella means against the surface to be cleaned.

15. A wiper installation combined with a washing installation according to claim 14 characterized in that the second shaft means is provided with a longitudinal bore for the feed of washing liquid and is provided at its outer end with a spray nozzle means.

16. A wiper installation according to claim 15, characterized in that at least one of the two parts consisting of mounting means and elastic wiper means is provided with channel means for the supply of washing liquid directly to the surface to be cleaned.

17. A wiper installation according to claim 1, characterized in that the first shaft means is arranged between two headlights and drives a double lamella means extending over both headlights, said second shaft means being at the edge of one of said headlights and a third shaft means being secured to said double lamella means at the edge of the other of said headlights.

18. A wiper installation according to claim 1, characterized in that the surface to be cleaned is a windshield and in that two of said lamellae means are arranged at said windshield, the first drive shaft means of the respective lamellae means being arranged in the outer lower corners of the windshield and the non-driven shafts of the respective lamellae means being arranged within the central area of the upper edge of the windshield.

19. A wiper installation according to claim 1, characterized in that the surface to be cleaned is a windshield and in that two of said lamellae means are arranged at said windshield, the first shaft means of the respective lamellae means being arranged within the central area at the upper edge of the windshield and the second non-driven shaft means of the respective lamellae means being arranged in the outer lower corners of the windshield.

* * * * *